US011169602B2

(12) United States Patent
Lehtiniemi et al.

(10) Patent No.: US 11,169,602 B2
(45) Date of Patent: Nov. 9, 2021

(54) APPARATUS, ASSOCIATED METHOD AND ASSOCIATED COMPUTER READABLE MEDIUM

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/462,434

(22) PCT Filed: Nov. 21, 2017

(86) PCT No.: PCT/FI2017/050798
§ 371 (c)(1),
(2) Date: May 20, 2019

(87) PCT Pub. No.: WO2018/096207
PCT Pub. Date: May 31, 2018

(65) Prior Publication Data
US 2019/0369722 A1    Dec. 5, 2019

(30) Foreign Application Priority Data

Nov. 25, 2016 (EP) .................... 16200755

(51) Int. Cl.
*G06F 3/01* (2006.01)
*G06F 3/00* (2006.01)
(Continued)

(52) U.S. Cl.
CPC ......... *G06F 3/013* (2013.01); *G02B 27/0101* (2013.01); *G06F 3/005* (2013.01);
(Continued)

(58) Field of Classification Search
CPC ....................................................... G06F 3/013
(Continued)

(56) References Cited

U.S. PATENT DOCUMENTS 9,704,298 B2 *   7/2017   Espeset .............. G11B 27/031
10,559,019 B1 *  2/2020   Beauvais ............ G06T 19/006
(Continued)

FOREIGN PATENT DOCUMENTS

EP    2996017 A1    3/2016
EP    3236345 A1    10/2017
(Continued)

OTHER PUBLICATIONS

Shah et al., "Metrics For Measuring Ideation Effectiveness", Design Studies, vol. 24, No. 2, Mar. 2003, pp. 111-134.
(Continued)

*Primary Examiner* — Javid A Amini
(74) *Attorney, Agent, or Firm* — Harrington & Smith

(57) ABSTRACT

An apparatus configured to, based on virtual reality content for presentation to a user in a virtual reality space for viewing in virtual reality, wherein a virtual reality view presented to the user provides for viewing of the virtual reality content, and an identified physical real-world object; providing for display of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object.

20 Claims, 8 Drawing Sheets

(51) Int. Cl.
*G06K 9/00* (2006.01)
*G02B 27/01* (2006.01)
*G06F 3/03* (2006.01)

(52) U.S. Cl.
CPC .......... *G06F 3/017* (2013.01); *G06F 3/0304* (2013.01); *G06K 9/00993* (2013.01); *G02B 2027/0138* (2013.01)

(58) Field of Classification Search
USPC ........................................................ 345/633
See application file for complete search history.

(56) References Cited

U.S. PATENT DOCUMENTS

| | | | |
|---|---|---|---|
| 2003/0025714 A1* | 2/2003 | Ebersole | G08G 5/0091 345/632 |
| 2008/0235581 A1* | 9/2008 | Caporale | A63F 13/12 715/706 |
| 2011/0046483 A1* | 2/2011 | Fuchs | A61B 8/4416 600/439 |
| 2012/0190446 A1* | 7/2012 | Rogers | A63F 13/47 463/31 |
| 2013/0339864 A1* | 12/2013 | Uusitalo | H04W 48/18 715/736 |
| 2015/0379770 A1* | 12/2015 | Haley, Jr. | G06T 19/006 345/633 |
| 2016/0217617 A1* | 7/2016 | Barribeau | G06F 3/04883 |
| 2016/0311116 A1* | 10/2016 | Hill | B25J 9/163 |
| 2017/0024934 A1* | 1/2017 | Numaguchi | A63F 13/65 |
| 2018/0261012 A1* | 9/2018 | Mullins | H04L 67/18 |
| 2019/0073832 A1* | 3/2019 | Kim | G06F 40/221 |
| 2020/0020161 A1* | 1/2020 | Jones | G06T 15/005 |
| 2021/0001171 A1* | 1/2021 | Fung | A63B 23/04 |

FOREIGN PATENT DOCUMENTS

| | | |
|---|---|---|
| WO | 2014/055924 A1 | 4/2014 |
| WO | 2015/159561 A1 | 10/2015 |

OTHER PUBLICATIONS

Smith., "Idea-Generation Techniques: A Formulary Of Active Ingredients", Journal of creative behavior, vol. 32, No. 2, 1998, pp. 107-133.

Smith, "Towards a logic of innovation", The International Handbook on Innovation, Dec. 2003. p. 347-365.

Extended European Search Report received for corresponding European Patent Application No. 16200755.3, dated Apr. 13, 2017, 8 pages.

International Search Report and Written Opinion received for corresponding Patent Cooperation Treaty Application No. PCT/FI2017/050798, dated Jan. 25, 2018, 11 pages.

Office action received for corresponding European Patent Application No. 16200755.3, dated Jun. 13, 2019, 6 pages.

* cited by examiner

800 based on virtual reality content for presentation to a user in a virtual reality space for viewing in virtual reality, wherein a virtual reality view presented to the user provides for viewing of the virtual reality content, and an identified physical real-world object;

providing for display of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object

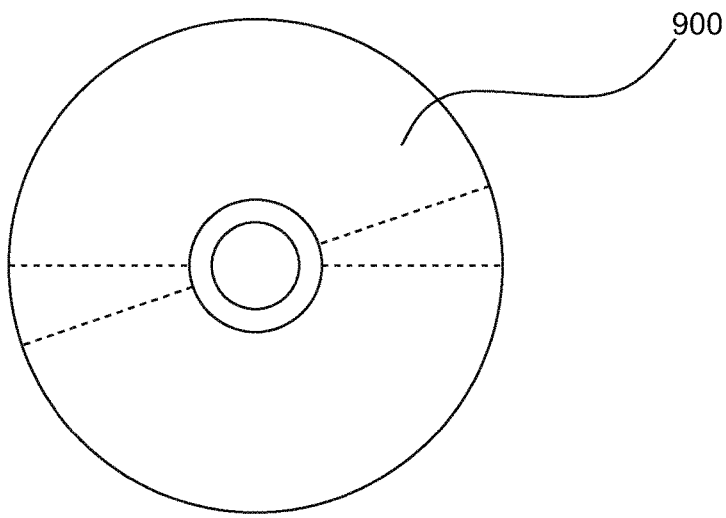

Figure 9

APPARATUS, ASSOCIATED METHOD AND ASSOCIATED COMPUTER READABLE MEDIUM

RELATED APPLICATION

This application was originally filed as Patent Cooperation Treaty Application No. PCT/FI2017/050798 filed Nov. 21, 2017 which claims priority benefit to EP Patent Application No. 16200755.3, filed Nov. 25, 2016.

TECHNICAL FIELD

The present disclosure relates to the field of virtual reality and, in particular, to the display of an object image showing a representation of an identified real-world object and a further real-world object. Associated methods, computer programs and apparatus is also disclosed. Certain disclosed aspects/examples relate to portable electronic devices.

BACKGROUND

Virtual reality (VR) may provide an immersive experience for a user to the detriment of user appreciation of the position of objects in the real-world around the user.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
    the at least one memory and the computer program code configured to, with the at least one processor, cause the apparatus to perform at least the following:
    based on virtual reality content for presentation to a user in a virtual reality space for viewing in virtual reality, wherein a virtual reality view presented to the user provides for viewing of the virtual reality content, and an identified physical real-world object;
    provide for display of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object.

In one or more examples, the virtual reality view may be provided by a virtual reality display, such as a head-mounted display, that partially or substantially completely obscures the user's view of the real-world.

In one or more examples, the location of the object image in the virtual reality view corresponds to a current real-world location, which may be tracked by one or more sensors and/or cameras.

In one or more embodiments, the further physical real-world object is identified as potentially hindering physical user-access to said identified physical real-world object if it is one or more of:
  i) within a predetermined distance of the identified physical real-world object;
  ii) within a predetermined distance of the identified physical real-world object and in front thereof relative to the user;
  iii) within a predetermined distance of a line that would connect the user and identified physical real-world object;
  iv) within a predetermined region identified by skeletal analysis of the user to identify a range of motion the user is capable of given the location and orientation of the user and the relative locations of the physical real-world object and the further physical real-world object;
  v) identified as such by the user; and
  vi) identified as such by a person other than the user while the user is presented with the virtual reality content.

In one or more embodiments, based on the relative locations of the physical real-world object and the further physical real-world object, the object image further comprises a guide arrow, the guide arrow configured to suggest to a user a path to take in the real-world to interact with the physical real-world object while avoiding the further physical real-world object.

In one or more embodiments, the guidance provided by the guide arrow is based on one or more of:
  i) analysis of the relative locations of the physical real-world object and the further physical real-world object to identify a shortest route to the physical real-world object while avoiding the further physical real-world object;
  ii) the left or right handedness of the user;
  iii) skeletal analysis of the user relative to the physical real-world object and the further physical real-world object to identify a route to the physical real-world object compatible with a range of motion the user is capable of given the relative locations of the physical real-world object and the further physical real-world object.

In one or more embodiments, the object image is based on one or more of:
  i) camera imagery of one or more of the physical real-world object and the further physical real-world object from a camera mounted with a virtual reality display that is configured to provide the virtual reality view to the user;
  ii) camera imagery of one or more of the physical real-world object and the further physical real-world object from a camera with a view of a region surrounding the user.

In one or more examples, the virtual reality view shows a spatial portion of the total spatial extent of the virtual reality content in the virtual reality space and based on said location of the object image in the virtual reality space being outside a region covered by the virtual reality view, provide for display of an indicator image configured to show the direction towards the identified physical real-world object relative to a current orientation of the user. In one or more examples, the apparatus is further caused to provide for display of a further indicator image configured to show the direction towards the further physical real-world object relative to a current orientation of the user.

In one or more embodiments, the display of the object image is based on detected motion of the user to interact with the identified real-world object.

Accordingly, in one or more examples, the apparatus may be caused to provide for display of the object image based on the detected motion and remove the object image from display if no such motion is detected, such as after a predetermined time of lack of said motion. In one or more examples, the motion may be any motion or may be motion comprising the reaching of a hand out from the user's body and/or towards the object.

In one or more examples, the representation of the further physical real-world object in the object image is displayed with a transparency effect such that the user can see the representation of the identified real-world object through the representation of the further identified real-world object.

In one or more embodiments, based on detected real-world user motion provide for display of a representation of the hand of the user at a location in the virtual reality space that corresponds to a location of the hand of the user in the real-world.

In one or more examples, based on said detected real-world user motion, the size of the object image may be temporarily increased to provide for display of a region around the real-world object to provide for the display of an image of a hand of the user as it approaches the identified real-world object.

In one or more embodiments, based on detection that a user has moved their hand beyond the further physical real-world object, provide for display of the object image with one or more of the representation of the further physical real-world object removed therefrom; a transparency effect; and a visual effect to provide for viewing of at least part of the identified real-world object that is obscured by the further physical real-world object.

In one or more embodiments, based on detection that the user has picked up the identified real-world object, provide for display of a surface image comprising a representation of a real-world surface on which the identified real-world object was located prior to being picked up.

In one or more examples, the object image may be removed from display during display of the surface image.

In one or more embodiments, the surface image includes a representation of the further physical real-world object at a location in the virtual reality space that corresponds to a real-world location of the further physical real-world object.

In one or more embodiments, based on the relative locations of the surface and the further physical real-world object, the surface image further comprises a guide arrow, the guide arrow configured to suggest to a user a path to take in the real-world in order to return the identified real-world object to the surface while avoiding the further physical real-world object.

In one or more embodiments, the relative sizes of the identified physical real-world object and further physical real-world object as presented in the object image is based on relative real-world locations of the physical real-world object and the further physical real-world object with respect to the user.

In one or more examples, the size of the object image that is provided for display is dynamically based on the distance between the user and the identified real-world object.

Thus, in one or more examples, the relative sizes, and optionally orientation, of the objects corresponds with how they are relatively positioned in the real-world, which may improve the ease with which the user may interact or pick up the object while continuing to watch the VR content, which may therefore mean they do not have to remove their VR display or headset.

In one or more embodiments, the identified physical real-world object is one or more of:
i) a user-identified physical real-world object, identified to the apparatus by the user following a user input;
ii) an automatically identified physical real-world object, identified to the apparatus by object recognition of a real-world region surrounding the user.

In one or more examples, the user-identified physical real-world object is identified by one or more of a user gesture towards or touching the real-world object; a selection of the object in a camera-captured image of a region surrounding the user in which the real-world object is visible; a voice or textual input identifying the real-world object by name or location, which provides for automatic identification of the identified object in a camera image of the real-world region surrounding the user.

In one or more embodiments, the object image comprises at least one of:
i) an icon representative of the physical real-world object;
ii) a photograph of the physical real-world object;
iii) a live image of the physical real-world object; and at least one of;
iv) an icon representative of the further physical real-world object;
v) a photograph of the further physical real-world object;
vi) a live image of the further physical real-world object.

In one or more examples, based on the object image comprising at least one of:
i) a photograph of the physical real-world object;
ii) a live image of the physical real-world object;
iii) a photograph of the further physical real-world object; and
iv) a live image of the further physical real-world object;
the apparatus is caused to provide for display of one or more of the physical real-world object and further physical real-world object substantially cut-out from any imagery of the real-world that surrounds it.

In a second example aspect there is provided a method, the method comprising
based on virtual reality content for presentation to a user in a virtual reality space for viewing in virtual reality, wherein a virtual reality view presented to the user provides for viewing of the virtual reality content, and an identified physical real-world object;
providing for display of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object.

In a third example aspect there is provided a computer readable medium comprising computer program code stored thereon, the computer readable medium and computer program code being configured to, when run on at least one processor, perform the method of:
based on virtual reality content for presentation to a user in a virtual reality space for viewing in virtual reality, wherein a virtual reality view presented to the user provides for viewing of the virtual reality content, and an identified physical real-world object;

providing for display of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object.

In a fourth example aspect there is provided an apparatus having means for:

based on virtual reality content for presentation to a user in a virtual reality space for viewing in virtual reality, wherein a virtual reality view presented to the user provides for viewing of the virtual reality content, and an identified physical real-world object;

providing for display of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object.

According to a further aspect of the disclosure we provide a system including the apparatus of the first aspect, a virtual reality apparatus for providing the virtual reality view and a sensor configured to track one or more objects around the user while they consume the VR content to provide for the determination of the relative locations of the identified physical real-world object and further physical real-world object.

The present disclosure includes one or more corresponding aspects, examples or features in isolation or in various combinations whether or not specifically stated (including claimed) in that combination or in isolation. Corresponding means and corresponding functional units (e.g., function enabler, point of view determiner, display device, virtual reality displaying apparatus, real-world object tracking element, image recognition and tracking element) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 8 shows a flowchart illustrating an example method; and

FIG. 9 shows a computer readable medium.

DESCRIPTION OF EXAMPLE ASPECTS

Figure 1:
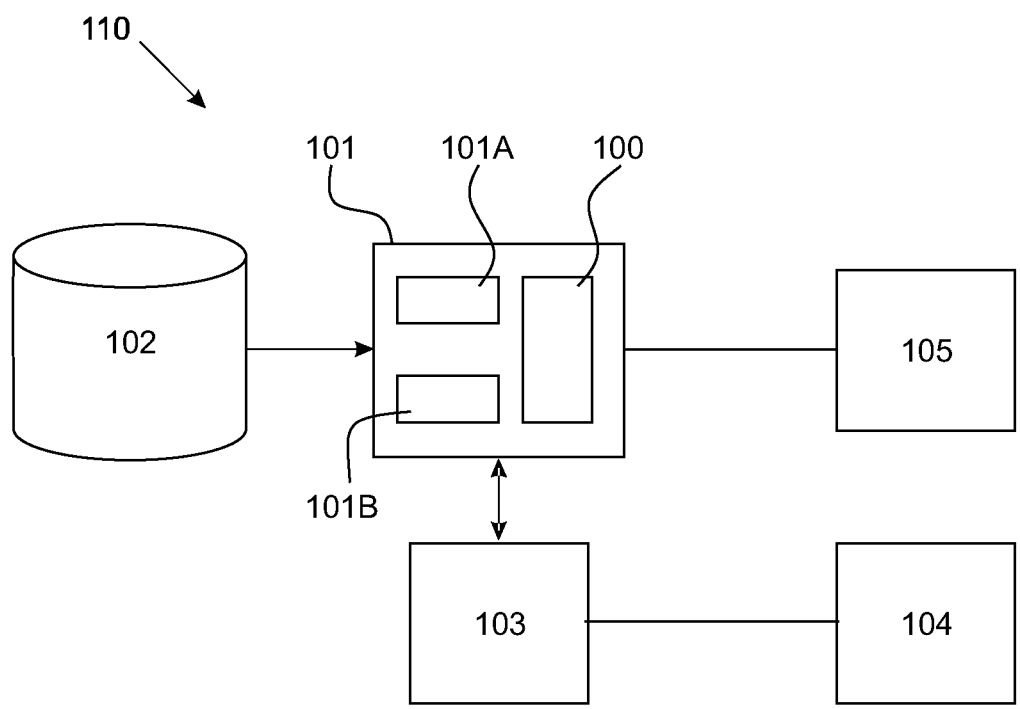
FIG. 1 illustrates an example apparatus.

Virtual reality (VR) may use a VR display comprising a headset, such as glasses or goggles or virtual retinal display, or one or more display screens that surround a user to provide the user with an immersive virtual experience. A virtual reality apparatus, using the VR display, may present multimedia VR content representative of a scene to a user to simulate the user being virtually present within the scene. The virtual reality scene may replicate a real world scene to simulate the user being physically present at a real world location or the virtual reality scene may be computer generated or a combination of computer generated and real world multimedia content. The virtual reality scene may be provided by a panoramic video (such as a panoramic live broadcast or pre-recorded content), comprising a video having a wide or 360° field of view (or more, such as above and/or below a horizontally oriented field of view). The user may then be presented with a VR view of the scene and may, such as through movement of the VR display (i.e. headset), move the VR view to look around the scene. Accordingly, a three-dimensional virtual reality space may be provided in which the virtual reality content is displayed and in which the user can look around and, optionally, explore by translation through the VR space.

The VR content provided to the user may comprise live or recorded images of the real world, captured by a VR content capture device, for example. As the VR scene is typically larger than a portion a user can view with the VR view presented on the VR display at any one time, the VR apparatus may provide for panning around of the VR view in the VR scene based on movement of a user's head or eyes. For example, the field of view in the horizontal plane of a VR display may be about 120° but the VR content may provide 360° video imagery. Thus, the field of view of the VR view provided by the VR display may be less than the total spatial extent of the VR content.

The virtual reality content may be provided with spatial audio having directional properties, such that the audio is perceived to originate from a point in the VR space, which may be linked to the imagery of the VR content. The spatial positioning of the audio may be provided by the degree to which audio is presented to each channel of a multichannel audio arrangement. When listening through headphones, directional audio perception may be created by filtering the audio signals for the left and right ear with the appropriate head-related transfer-function (HRFT) filters.

A VR content capture device is configured to capture VR content for display to one or more users. A VR content capture device may comprise one or more cameras and one or more (e.g. directional and/or ambient) microphones configured to capture the surrounding visual and aural scene from a point of view. An example VR content capture device is a Nokia OZO camera of Nokia Technologies Oy. Thus, a musical performance may be captured (and recorded) using a VR content capture device, which may be placed on stage, with the performers moving around it or from the point of view of an audience member. In each case a consumer of the VR content may be able to look around using the VR display of a VR apparatus to experience the performance at the point of view of the capture location as if they were present.

The consumption of VR content may provide an immersive experience that may make appreciation of what is occurring in the real-world in the vicinity of the user difficult. In particular, the location of physical objects in the real world may be difficult to locate or remember or may be prone to being knocked into while VR content is being consumed. This may be particularly so in one or more examples wherein the VR display covers the user's eyes, such as due to a head-mounted display, that partially or substantially completely obscures the user's view of the real-world. Accordingly, in one or more examples, aiding the appreciation of the location of real-world physical objects while immersed in virtual reality content may be desirable.

With reference to FIG. 1, the apparatus 100 may form part of or be in communication with a VR apparatus 101 for presenting VR content to a user. A store 102 is shown representing the VR content stored in a storage medium or transiently present on a data transmission bus as the VR content is captured and received by the VR apparatus 101. The VR content may be captured by at least one VR content capture device and may be live or recorded. A user may use a VR head set 103 or other VR display to view the VR content. The apparatus 100 may include one or more sensors associated therewith for identification and/or tracking of physical objects in a region around the user. In one or more examples, one or more of the sensors may comprise a camera 104 that is associated with the VR display 103. The camera 104 may provide an image from the point of view of the user, i.e. a user-mounted camera, such as mounted to the VR display 103. The view from the camera 104 may be substantially equivalent to the view of the user's surroundings as if they were not wearing the VR display 103. In one or more examples, a second sensor, which may comprise a camera 105 is provided. The camera 105 is configured to capture a view of the user's surroundings and optionally also the user 200. Thus, in summary, one or more sensors, which may comprise cameras, may be configured to capture information about objects in a region surrounding the user of the VR apparatus 101 using visual or other object tracking methods. One or more of the one or more sensors may comprise a camera capable of determining depth in a scene. One or more of the sensors may be configured to capture information from the point of view of the user. One or more of the sensors may be configured to capture a view of the user and theft surroundings from a view point remote from the user. The one or more sensors may comprise one or more of cameras (visible light cameras or any other wavelength); direction and ranging devices, such as radar or sonar based sensors; locator tag sensors to calculate the position of tags attached to objects in the region surrounding the user by wireless signalling and any other appropriate sensor for sensing objects in the region around the user.

The apparatus 100 may be configured to provide for display of an object image (described in more detail below in relation to FIGS. 2 to 7) that at least includes a representation of an identified physical real-world object that it appears overlaid on virtual reality content presented in a virtual reality view of the VR display 103.

The apparatus 100 may provide for display of an object image based on information from the sensors 104, 105 to a user while they are viewing the VR content using the VR display 103. Accordingly, the VR apparatus 101 may provide signalling to the apparatus 100 to indicate where in the VR space the user is looking such that it can be determined at what location to provide for display of the object image. In one or more examples, the apparatus 100 may provide for determination of the location of one or more objects around the user and based on where the user is looking in the VR space, provide for display of an correspondingly positioned object image that overlays the VR content. The object image, in one or more examples, may be considered to be a virtual window through the VR display 103 so that the user can see the identified real-world object without interrupting viewing of the VR content.

In this embodiment the apparatus 100 mentioned above may have only one processor 101A and one memory 101B but it will be appreciated that other embodiments may utilise more than one processor and/or more than one memory (e.g. same or different processor/memory types). Further, the apparatus 100 may be an Application Specific Integrated Circuit (ASIC). The apparatus 100 may be separate from and in communication with the VR apparatus 101 or, as in FIG. 1, may be integrated with the VR apparatus 101.

The processor 101A may be a general purpose processor dedicated to executing/processing information received from other components, such as the VR apparatus 101 and the apparatus 100, in accordance with instructions stored in the form of computer program code on the memory. The output signalling generated by such operations of the processor is provided onwards to further components, such as to the VR apparatus 101 for display of the object image to the user.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor 101A and the memory 101B are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
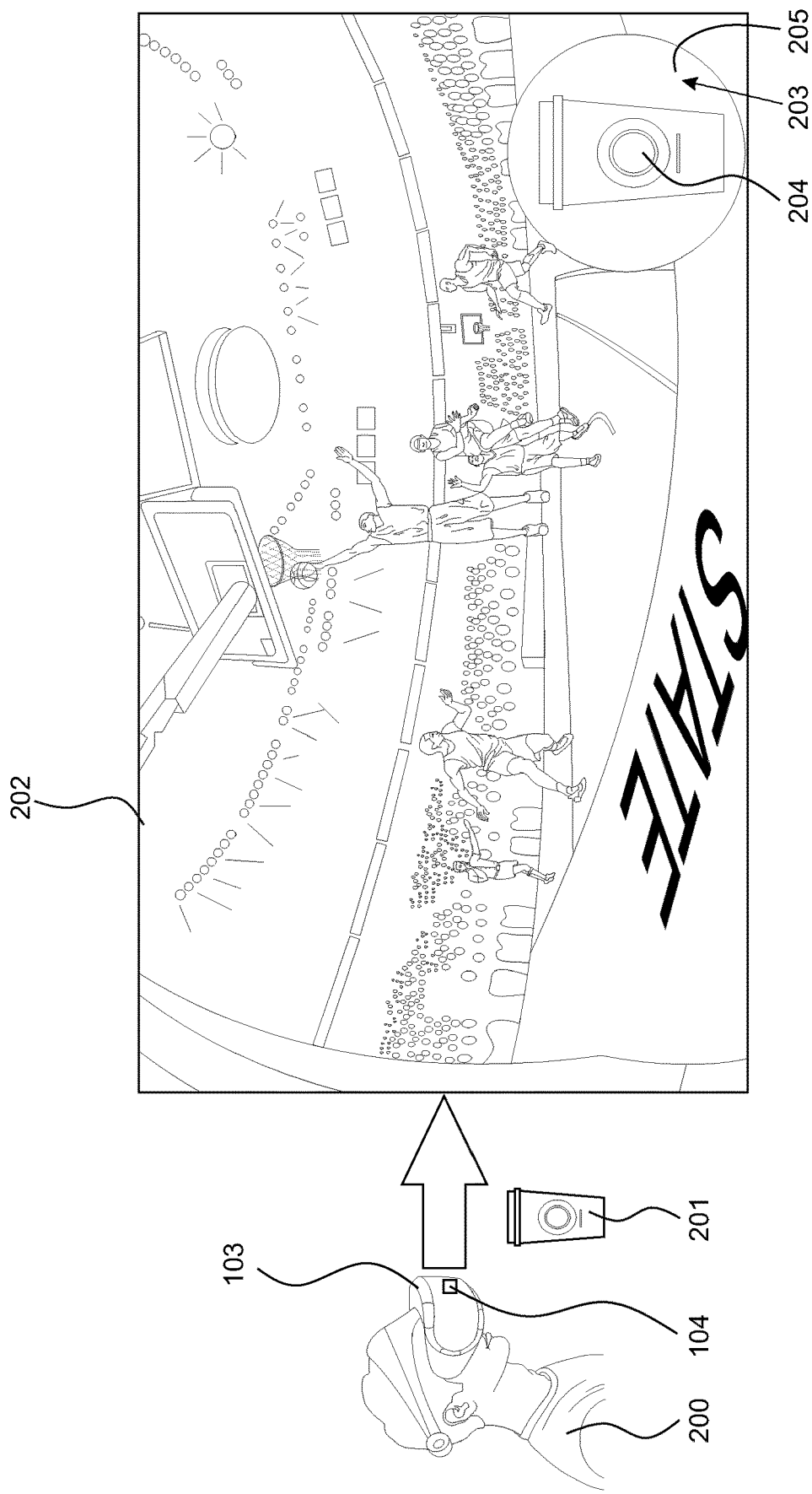
FIG. 2 shows a user in the real-world with an object as well as a VR view provided to the user.

FIG. 2 shows a user 200 consuming VR content using, in this example, a head mounted VR display 103. It will be appreciated that other types of VR display may be used. FIG. 2 also shows at least part of the real-world surroundings of the user 200, which happens to include a physical object comprising a coffee cup 201. A virtual reality view 202 of virtual reality content comprising a basketball game is shown to illustrate what is provided to the user for viewing in virtual reality via the VR display 103 by the apparatus 100 and VR apparatus 101.

The object 201 may be identified as one that that user may wish to keep track of while consuming VR content. The physical real-world object may be identified as such by one or more of: a user input to identify the object 201 to the apparatus 100; and automatic identification to the apparatus 100 or by the apparatus 100 by way of object recognition. It will be appreciated that one or more objects 201 may be identified as being ones that the user may wish to keep track of.

In one or more examples, where the object 201 is user-identified the apparatus 100 may be configured to provide for the identification of the object by one or more of a detected user gesture towards or touching the real-world object, such as a hand gesture; a selection of the object in an image, such as from camera 104 or 105, of a region surrounding the user in which the real-world object is visible; and a voice or textual input identifying the real-world object by name or location. The apparatus 100 may provide for, based on the voice or textual input, object recognition of said input object in the information or images from the one or more cameras 104, 105 and/or other sensors. One or more of the cameras may be configured to determine depth in the images they capture and therefore a gesture towards an object 201 may be identifiable. The identification of the object 201 by the user may be performed by the user prior to them putting on the VR display/headset 103. Automatic identification of the object may be achieved by automatic recognition of objects surrounding a user and identification of at least a subset of those object that the user may wish to be tracked. For example, the apparatus may provide for automatic identification of objects that are one or more of: precariously placed; movable, such resting on a fixed surface; within a predetermined distance of the user; and based on a predetermined list of objects.

In this example, the user 200 may identify the coffee cup to the apparatus 100 by tapping it. The apparatus 100 may be configured to interpret a gesture, such as the tap, as the identification of a physical real world object 201.

FIG. 2 shows an object image 203 comprising an image or representation 204 of the identified physical real-world object 201 overlaid over the VR content in the VR view 202. In the example illustrated in FIG. 2, the object image 203 only comprises the physical real-world object 201. The object image 203 may be displayed at a location in the virtual reality space that corresponds to the real-world location of the identified physical real-world object 201 relative to the user. Thus, in this example, the coffee cup 201 happens to be in front of the user 200 and slightly to the right and lower than the user's head. The location of the object 201 may be determined based on information from the one or more sensors 104, 105 and the orientation of the user's viewing direction may be determined by sensors of the VR display 103 and/or the VR apparatus 101. Accordingly, the apparatus 100 may provide for display of the object image 203 at a corresponding location in the VR view 202 that is in front of the user 200 and slightly to the right and lower than a centre of the user's line of sight. The positioning of the object image 203 may allow for the user to determine where in the real-world they may interact with or pick up the object 201.

In one or more examples, the object image 203 may comprise a live image of the identified physical real-world object 201 based on the image captured by the one or more cameras 104, 105. However, the object image may comprise an icon representative of the physical real-world object, which may be generic and thereby independent of the appearance of the object or may comprise an icon of the object. For example, the object 201 may be identified as a coffee cup and therefore the icon may comprise an image of a generic coffee cup, such as retrieved from an icon store or the internet. In one or more examples, the object image may comprise a photograph of the physical real-world object 201, such as from the camera 104, 105, and may be captured on identification of the object 201. In one or more examples, the object image may comprise a live image of the physical real-world object, such as from one or more of the cameras 104, 105. The camera that provides the live image may be selected based on where the user is looking and whether the object is within the field of view of the camera.

The object image 201 may also comprise an image 205 of a region of real-world space that surrounds the object 201. In one or more examples, the apparatus 100 may provide for display of the physical real-world object 201 substantially cut-out from any region of real-world space that surrounds it.

Figure 3:
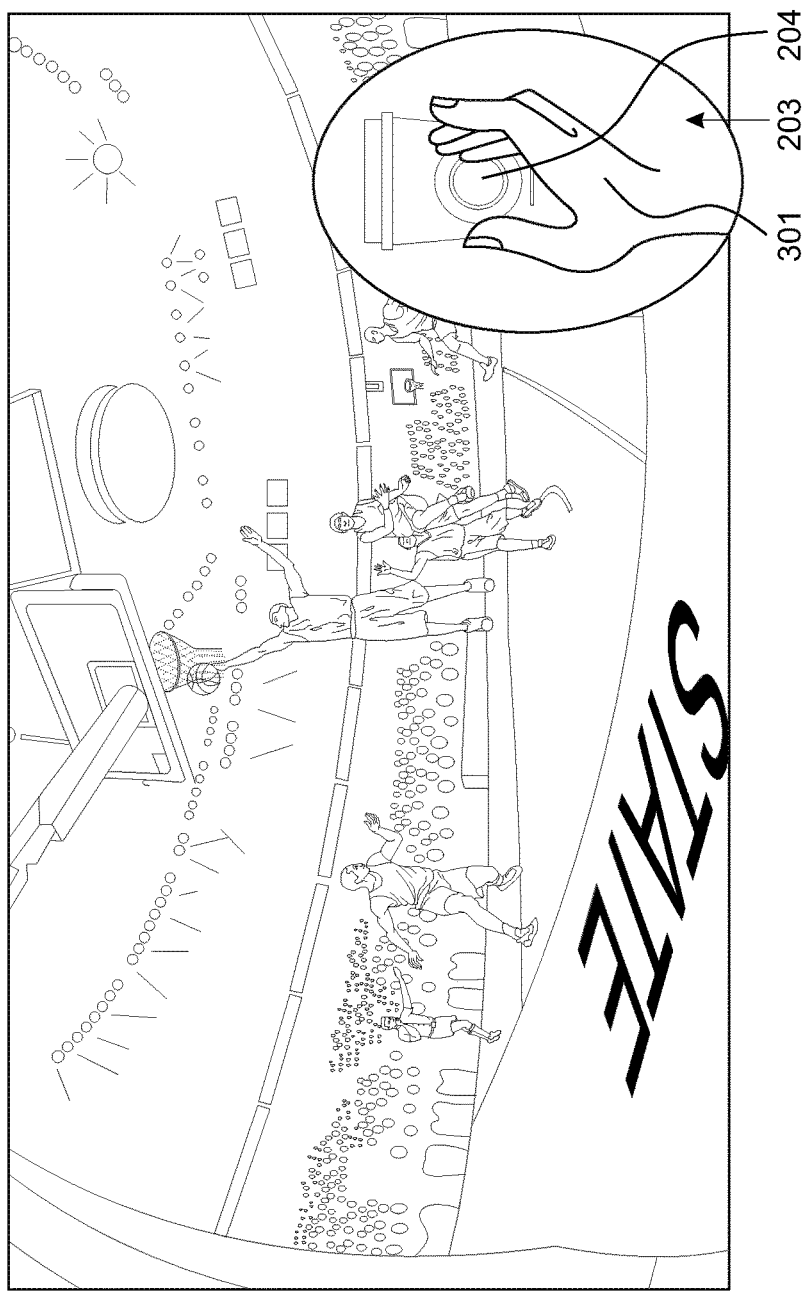
FIG. 3 shows the user picking up the object.
Figure 3:
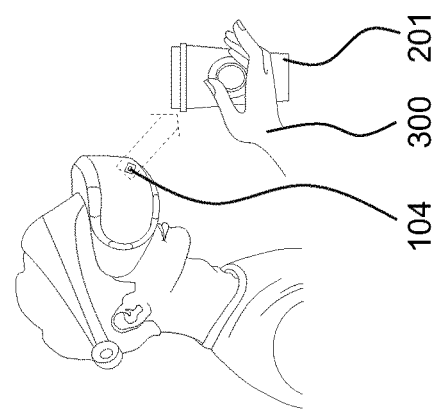

FIG. 3 illustrates the user reaching for the object 201 with their hand 300. The apparatus 100 may be configured to provide for display of the object image 203 with an image of the user's hand to enable them to see themselves (i.e. their hand) picking up the object 201. If the object image is derived from a live camera image, such as from camera 104, then the object image may include a live image 301 of the user's hand 300. If the object image 203 includes an icon of the object 201, then the apparatus may provide for display of an icon of the user's hand as part of the object image 203. It will be appreciated that any combination of live images, icons, and photographs of the object and user's hand may be provided as part of the object image 203. Further, the user may, rather than user their hand, interact with the object 201 using a finger, stylus or any other object, which may be provided for display as part of the object image 203, as described for the user's hand herein.

Further, FIG. 3 shows the object image 203 increased in size to accommodate the view of the user's hand 300. Accordingly, the size of the object image 201, or at least the size of the region surrounding the object 201 that is provided for display may be dynamically based on the distance between the user (e.g. their hand) and the identified real-world object 201. Thus, in one or more examples, while the size of the representation 204 in the object image 203 may be based on the relative distance between the object 201 and the user 200, the size of the object image may be based on detected user movement towards the object 201.

Figure 4:
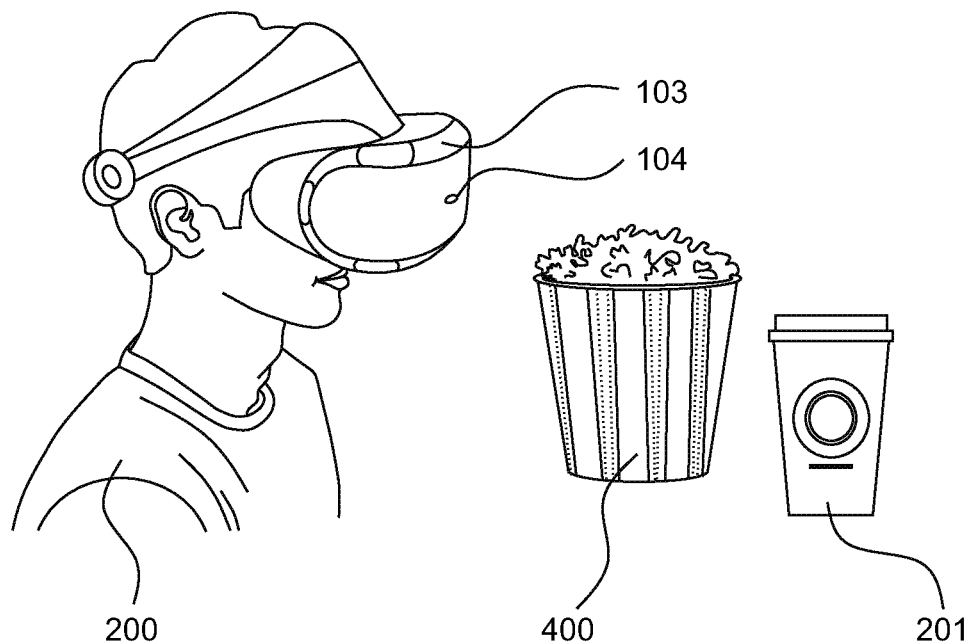
FIG. 4 shows an identified physical real-world object and a further physical real-world object.

FIG. 4 shows the user 200 consuming VR content via the VR display 103 as well as the physical real-world object 201. It happens that a further physical real-world object 400, comprising a bowl of popcorn in this example, has been placed in the region surrounding the user 200. The user 200 may not be aware that the further physical real-world object 400 has been placed nearby or may be aware of it arriving but not its location. The further physical real-world object 400 may potentially hinder physical access to the physical real-world object 201 as it has been placed in this example between the user 200 and the physical real-world object 201.

The placement of a further object between the user 200 and the object 201 may comprise one of a plurality of conditions that may determine whether or not a further object is potentially hindering physical user-access to said physical real-world object 201. The apparatus 100 may provide for identification of further objects that may potentially hinder physical user-access to said identified physical real-world object 201 using the one or more cameras 104, 105 or sensors. For example, if the apparatus is configured to identify further objects by way of them being positioned between the user 200 and the object 201, the apparatus 100 may be configured to provide for identification of further objects 400 using information from the camera 104, which may be mounted to the VR display 103. It will be appreciated that one or more other sensors or cameras or combinations thereof may be used to identify the further object 400.

In one or more examples, the further physical real-world object is identified as potentially hindering physical user-access to said identified physical real-world object if it is within a predetermined distance of the identified physical real-world object. Accordingly, the apparatus 100 may provide for determination of a predetermined distance around the object 201 and provide for identification of objects that are within said predetermined distance. For example, the camera 105, which may be configured to measure depth within the scene it captures may be used to identify one or more further objects 400. In one or more examples, the apparatus 100 may be configured to provide for determination of whether or not the further object is potentially hindering access based on whether or not the further object 400 is within a predetermined distance from the object 201 and also in front thereof relative to the user. In one or more examples, the apparatus 100 may provide for determination of whether or not the further object is potentially hindering access based on whether or not the further object 400 is within a predetermined distance of a line that would connect the user and identified physical real-world object 201. Such a distance from an imaginary line could be considered to define a volume that a user's arm and hand may pass through when reaching for the object 201 and thus any further object within that volume may hinder access. In one or more examples, the apparatus 100 may provide for determination of whether or not the further object 400 is potentially hindering access if it lies within a predetermined region identified by skeletal analysis of the user to identify a range of motion the user is capable of given the location and orientation of the user and the relative locations of the physical real-world object 201 and the further physical real-world object 400. Accordingly, the apparatus 100 may provide for collection of information on the position and/or orientation of the user's limbs, an orientation of the user's body, the distance from the object 201, such as by way of sensors 104, 105, and with predetermined data on skeletal ranges of motion, identify a region around the user into which their limbs may stray when picking up the object 201. Any further object 400 in this region may be determined to be potentially hindering access to the object 201. In one or more examples, the further object 400 may be identified as such by the user 200. For example, when the popcorn is placed nearby the user may provide user input to the apparatus 100. The apparatus 100, based on the user input, may provide for identification of the further object 400 and provide for tracking of the position of the further object 400. Thus, the user may know that someone has placed a bowl of popcorn nearby and may issue a voice command "track popcorn" to which the apparatus 100 may provide for identification of an object that comprises a bowl of popcorn in the space surrounding the user. In one or more examples, the further object 400 may be identified to the apparatus 100 by a person other than the user 200 while the user is presented with the virtual reality content. For example, if the further object was placed near the user by a different person, that person could provide an input to the apparatus 100 to provide for identification of the object 400, such as by a voice, textual, gesture or other input means. The apparatus 100, based on input from a person other than the user, may be configured to identify the further object 400 and provide for tracking of the position of the further object 400. The user input from the user or person other than the user may be by way of a gesture, a voice or textual input or any other input method. Thus, the identification of a further object 400 as potentially hindering access may be performed by the user 200 or not by the user 200. When not performed by the user, the apparatus 100 may be configured to provide for automatic identification of further object(s) (using one or more of the cameras/sensors 104, 105) and/or based on input from a person other than the user. It will be appreciated that combinations of the above conditions/methods for identification of the further object 400 may be used.

Figure 5:
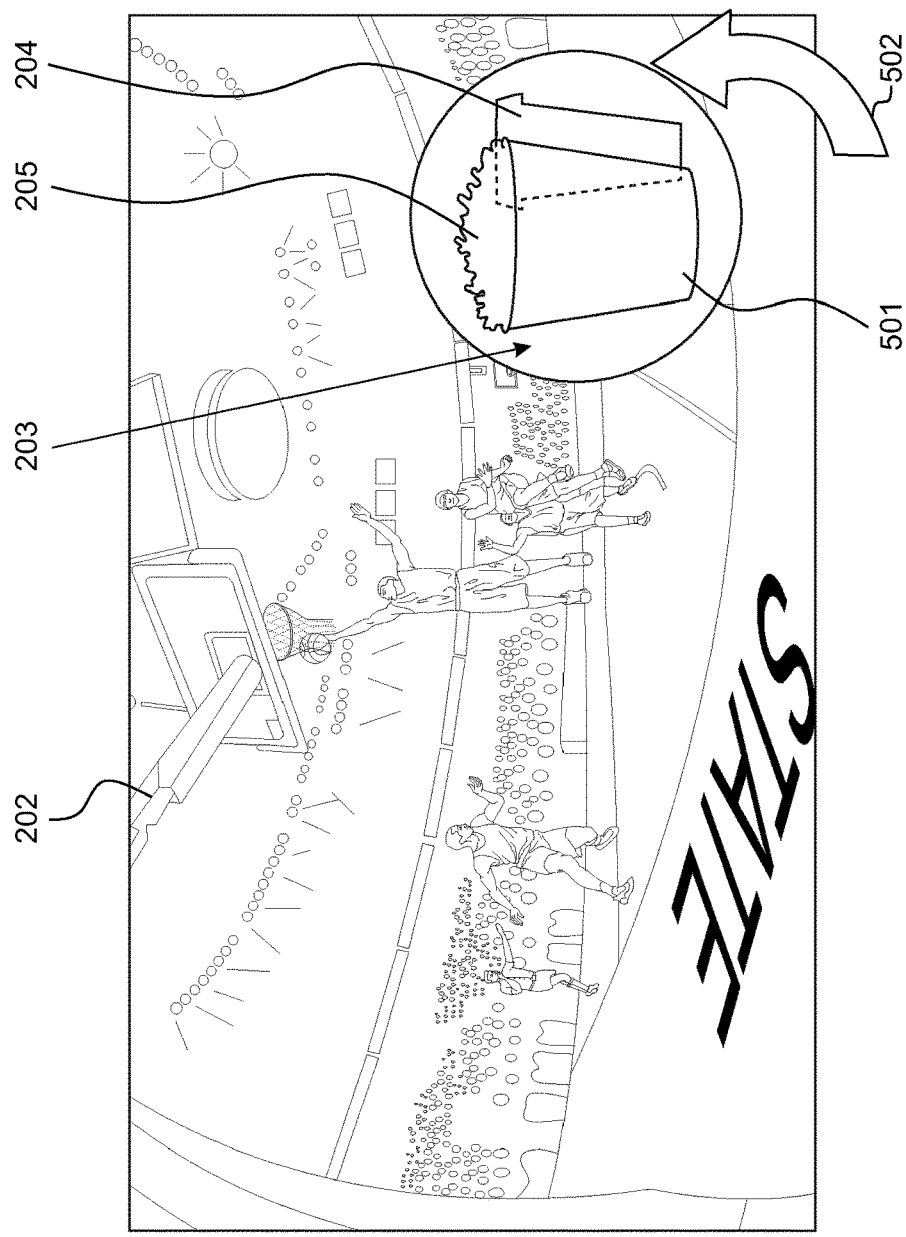
FIG. 5 shows an example embodiment showing an object image provided to the user.
Figure 5:
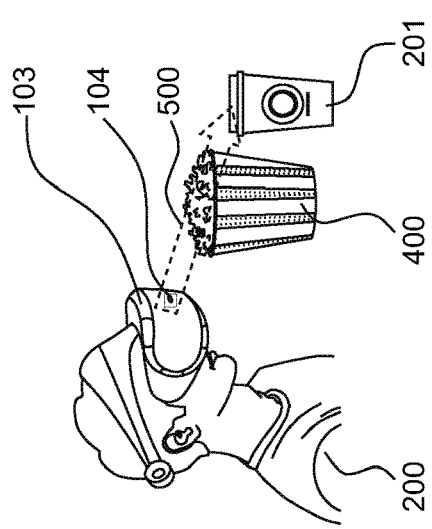

FIG. 5 shows, by way of dotted arrow 500 that, in the real-world, the user's 200 view of the coffee cup 201 would be obscured by the bowl of popcorn 400. In the VR view 202, the object image, as previously, includes a representation 204 of the identified physical real-world object 201 that is overlaid on the virtual reality content presented in the virtual reality view 202. Further, as before, the object image 203 is displayed at a location in the virtual reality space that corresponds to the real-world location of the identified physical real-world object relative to the user 200. In the example embodiment of an aspect of the invention illustrated by FIG. 5, the object image 203 further includes at least a representation 501 of the further physical real-world object 400 that is identified as potentially hindering physical user-access to said identified physical real-world object 201.

The representation 501 may also be displayed at a location in the virtual reality space that corresponds to the real-world location of the further physical real-world object 400 relative to the user 200 and to the identified physical real-world object 201.

Similar to as described in relation to the representation 204 of the object 201, the representation 501 may comprise at least one of a live image of the further physical real-world object 400, an icon representative of the further physical real-world object 400, and a photograph of the further physical real-world object 400. The object image 203, which includes the representation 204 and the representation 501 may be provided from the imagery taken by camera 104, and may therefore naturally include imagery of both the object 201 and further object 400. In one or more examples, where it is determined that the object 201 is hidden from view in the imagery taken from the user-mounted camera 104, the apparatus 100 may provide for display of a composite object image 203 that includes information from two or more other cameras/sensors 105. For example, imagery from a different camera 105 may be used to show a representation 204 of the object 201 and/or the information from the one or more other cameras/sensors 105 may be used to position the object 201 and an icon or other representation may be provided. In one or more examples, the representation 501 of the further object 400 may be presented with a transparency effect such that the representation 204 is visible in the object image 203. Further, the object image 201 may also comprise an image of a region of real-world space that surrounds the further object 400. In one or more examples, the apparatus 100 may provide for display of the further physical real-world object 400 substantially cut-out from any region of real-world space that surrounds it.

In one or more examples, the relative sizes of the representation 204 of the identified physical real-world object 201 and the representation 501 of the further physical real-world object 400 is based on relative real-world locations of the physical real-world object 201 and the further physical real-world object 400 with respect to the user 200. Accordingly, the apparatus 100 may provide for determination of the relative distances between the user 200 and the physical real-world object 201 and the further physical real-world object 400. Based on the relative distances, the apparatus 100 may provide for the representations 204, 501 to be sized appropriately to correspond with how they would be perceived based on the user's perspective in the real-world. The relative distances may be determined based on information from the one or more cameras/sensors 104, 105. Further, one or more of the representations 204, 501 may replicate the orientation of the object 201 and further object 400. Providing an accurate representation 204, 501 of the object 201 and further object 400 may, in one or more examples, improve the ease with which the user may interact or pick up the object 201 while continuing to watch the VR content, which may therefore mean they do not have to remove their VR display headset 103. The representations may be displayed with a visual 3-D depth effect that is based on the real-world distance of the object 201/further object 400 from the user 200.

The apparatus 100 may, in one or more examples, provide for tracking of the position of the object 201 and the further object 400 and provide for display of a correspondingly positioned object image in the VR view showing the current position of the object 201 and the further object 400 by way of the representations 204, 501. Accordingly, as the user 200 moves around the real-world space, the apparatus 100 may provide for active identification of one or more (new) further objects 400 that may potentially hinder physical user-access to said identified physical real-world object 201 and provide for display of correspondingly positioned (new) representations 204, 501. Thus, while the user 200 is consuming VR content and moving around in real-world space, objects surrounding the user may qualify as or no longer qualify as objects that potentially hinder physical user-access to said identified physical real-world object 201 and the apparatus 100 may provide for display of an object image 203 that only includes representations 501 of further objects 400 that currently, potentially hinder physical user-access to the object 201.

In one or more examples, the apparatus 100 may provide for display of a guide arrow 502 as part of the object image 203 that illustrates a suggested path for the user to take to reach the physical real-world object 201. The apparatus 100 may be configured to provide a guide arrow that guides the user in a direction that is based on the relative locations of the physical real-world object 201 and the further physical real-world object 400, which may be determined by one or more of sensors/cameras 104, 105. The apparatus may determine a path for the guide arrow 502 to illustrate that comprises the shortest distance to reach the object 201 while avoiding the further physical real-world object 400. However, the apparatus 100 may be configured to determine the path based on a detected left or right handedness of the user, which may therefore take account of the hand the user would prefer to use in reaching for the object 201. The left or right handedness may be input by the user 200 as a user preference or may be detected automatically by the apparatus 100 based on sensor/camera 104, 105 observations. The apparatus 100 may determine a path for the guide arrow 502 based on skeletal analysis of the user 200 relative to the physical real-world object 201 and the further physical real-world object 400 to identify a path to the physical real-world object 201 compatible with a range of motion the user 200 is capable of given the relative locations of the physical real-world object and the further physical real-world object. Thus, with appreciation of the range of motion available to the user given the orientation of their body and limbs, a guide arrow 502 illustrating an advantageous path may be provided.

The guide arrow 502 itself may take any visual form, such as a line, arrow, and may be animated. Further, the path illustrated by the guide arrow 502 may be dynamically determined such that changes in the relative position of the user 200 and the object 201 and further object 400 may provide for changes in the path illustrated by the guide arrow 502. In one or more examples, the virtual reality view 202 shows a spatial portion of the total spatial extent of the virtual reality content in the virtual reality space. Accordingly, given that the object image 203 is displayed at a position in the virtual reality space that corresponds to the real-world location of the object 201 and further object 400, when the user is looking in a direction away from the object 201 and further object 400, no object image will be visible in the VR view 202. Thus, in one or more examples, in such a situation in which said location for the object image 201 in the virtual reality space is outside a region covered by the virtual reality view 201, the apparatus 100 may provide for display of an indicator image configured to show the direction towards the identified physical real-world object 201 relative to the current orientation of the user 200. The indicator image may comprise an arrow or other graphic pointing or directing in a direction towards the object 201 or may comprise a visual effect, such as a glowing effect, applied at a side of the VR view 201 nearest to a position of the object 201 relative to the user 200. In one or more examples, the apparatus 100 is further caused to provide for display of a further indicator image configured to show the direction towards the further physical real-world object 400 relative to a current orientation of the user. Accordingly, the apparatus 100 may provide for directing of the user towards the identified object by way of the indicator image. In one or more examples, the apparatus 100 may provide for directing of the user towards the identified object by presentation of directional audio instead of or in addition to the indicator image.

The display of the object image 203 in the above examples is shown as a "window" within which the representations 204, 501, as well as any guide arrow 502, is displayed. However, in one or more other examples, the object image 203 may comprise one or more spaced sections, such as the representation 204 spaced from the representation 501 with the "underlying" VR content displayed in between. It will be appreciated that the size of the "window" or the spacing of the representation 204 and the representation 501 may be based on the current relative positions of the user 200, identified physical real-world object 201 and further object 400.

In one or more examples, the object image 203 may not be displayed all of the time, even if the identified physical real-world object 201 and further object 400 are located relative to the user 200 such that they would appear in the VR view. For example, if the user 200 does not move or does not reach for the object 201, then the apparatus 100 may be configured to remove the object image 203 from display. Thus, the display of the object image 203 may be based on detected motion of the user 200 to interact with the identified real-world object 201. The motion may be detected by one or more sensors/cameras 104, 105. In the absence of motion, or after a predetermined time without detection of motion, or based on the distance between the user 200 and the object 201 being greater than a threshold amount (i.e. the user may not be able to reach the object quickly) the apparatus 100 may provide for removal of the object image from display, such as by fading out the object image 203. In response to detected motion of the user or detection of a particular predetermined gesture, such as a reaching gesture, the apparatus 100 may provide for display of the object image 203. The predetermined gesture may be any detectable gesture, and/or may be set by the user 200.

Figure 6:
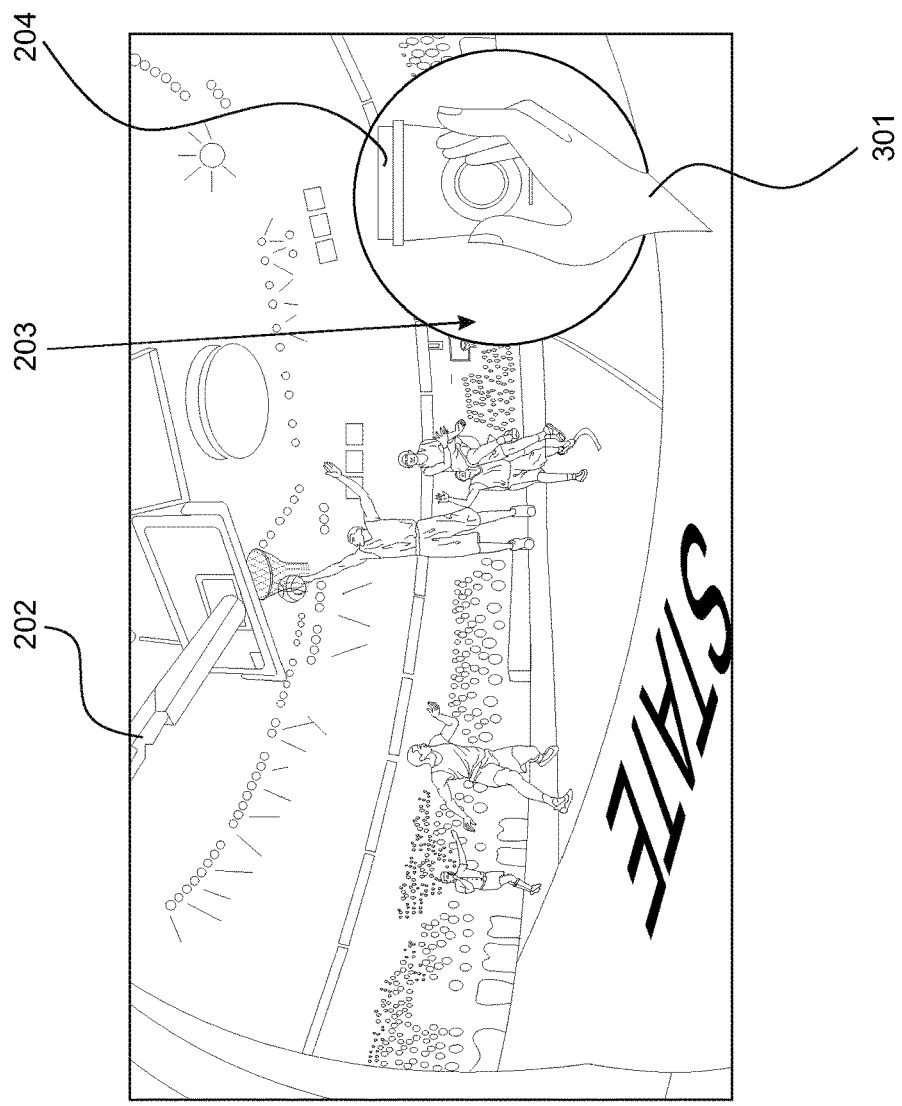
FIG. 6 shows the user picking up the physical real-world object.
Figure 6:
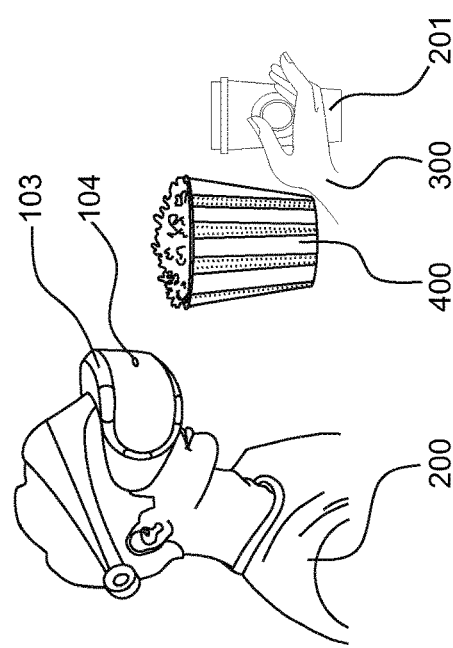

FIG. 6 shows the user 200 reaching for the coffee cup 201 in the real-world with their hand 300. The user 200 may follow the path suggested by the guide arrow 502. The apparatus 100 may provide for the display of the representation 301 of the user's hand 300 as part of the object image 203. The display of the representation 301 may be in response to detected real-world user motion, which may comprise a motion towards the object 201, such as to interact with the identified real-world object 201. The position of the representation 301 in this example is at a location in the virtual reality space that corresponds to a current location of the hand of the user in the real-world. Thus, the apparatus 100 may provide for active positioning of the representation 301 so that the user can appreciate the current relative position of their hand 300 and the object 201.

In FIG. 6, the representation 501 of the further object 400 has been removed. This may provide a clearer view of the object 201 for picking it up. The apparatus 100 may be configured to, based on detection that the user 200 has moved their hand 300 beyond the further physical real-world object 400, provide for display of the object image 203 with the representation 501 of the further physical real-world object 400 removed therefrom. The apparatus 100 may be configured to use information or images from the one or more of the sensors/cameras 104, 105 to determine the user's hand position and when the user may have moved their hand beyond the further object 400. In one or more examples, rather than being removed from display, the representation 501 of the further object 400 may be displayed with a more transparent transparency effect or may be displayed in dashed lines or with any other visual effect to signify the user's hand moving beyond it.

The size of the object image 203 and/or the size of a region of real-world space around the object 201 provided for display in said object image 203 may be dynamic. Thus, the size of the object image may be increased based on detected attempted user interaction with the object 201 and may be decreased based on the absence of detected attempted user interaction with the object 201. Any user motion may be determined to be "attempted user interaction" or the detected reaching of a user's arm may be determined to be "attempted user interaction". In one or more examples, based on said detected real-world user motion, the size of the object image 203 may be temporarily increased to provide for display of a region around the real-world object 201 to provide for the display of a representation 301 of the hand 300 of the user as it approaches the identified real-world object 201.

Figure 7:
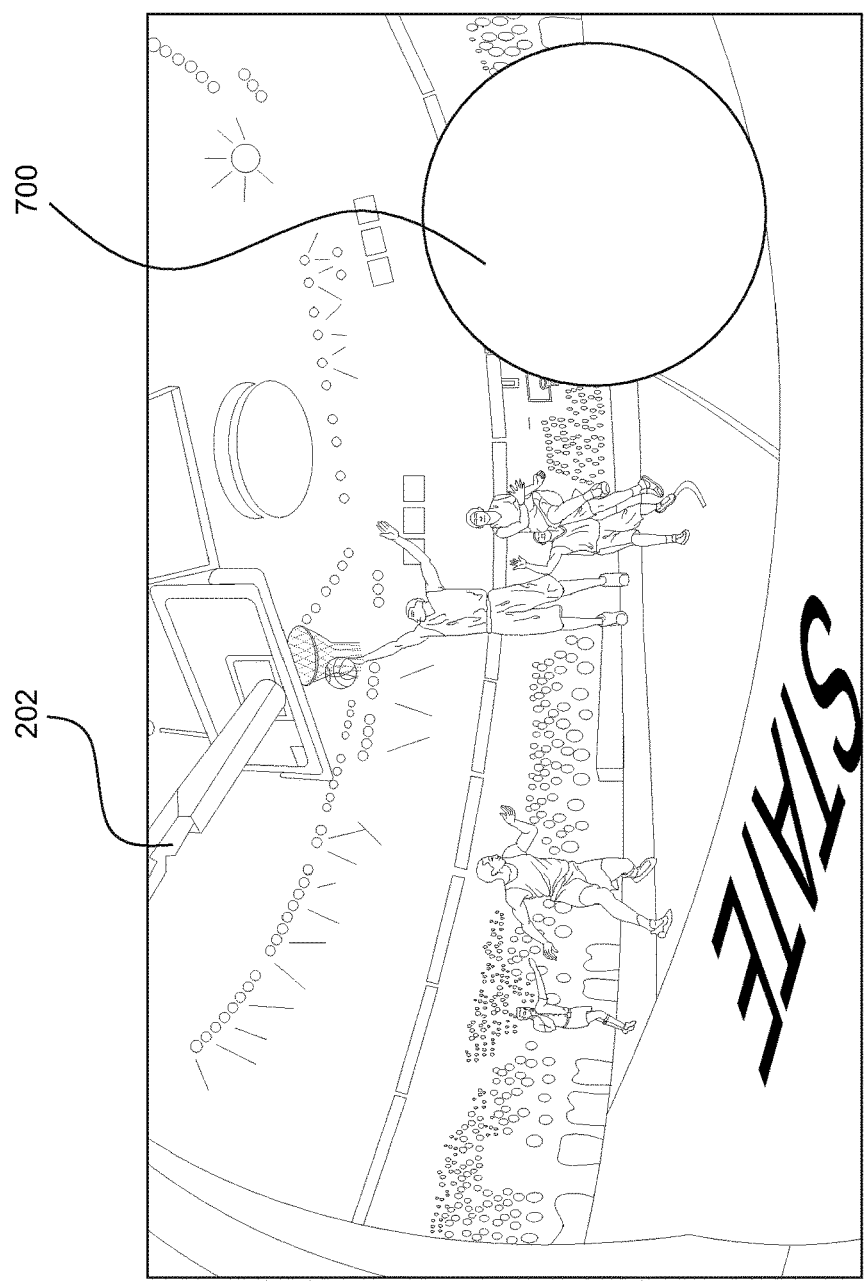
FIG. 7 shows the user having picked up the physical real-world object.
Figure 7:
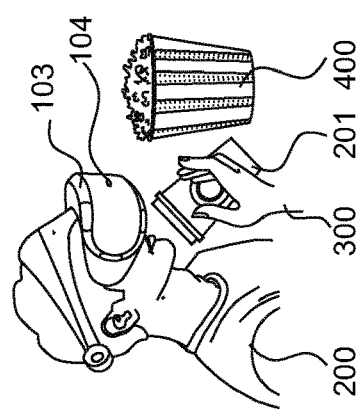

FIG. 7 shows the user 200 having picked up the coffee cup 201 while still consuming the VR content. The apparatus 100 may provide for detection of when the user 200 picks up the identified real-world object 201. Based on detection that the user 201 has picked up the identified real-world object 201, the apparatus may provide for display of a surface image 700 comprising a representation of a real-world surface on which the identified real-world object was located prior to being picked up. In one or more examples, the object image 203 may be removed from display during display of the surface image 700. The surface image 700 (similar to the object image) may be displayed at a position in the virtual reality space corresponding to the position of the real-world surface relative to the user 200. Accordingly, the user 200 is able to appreciate where to place the object 201 when they have finished interacting with it without having to remove the VR display 103.

The surface image 700 may include the representation 501 of the further object. The surface image 700 may include the guide arrow 502 indicative of a path the user should follow. Thus, the guide arrow may be configured to suggest to a user a path to take in the real-world in order to return the identified real-world object 201 to the surface while avoiding the further physical real-world object 400.

In the above described examples, the user interacts with the object 201 with a hand, however any other implement may be used, tracked and a representation provided for display as appropriate to guide the user to interact or pick up the object 201 while avoiding the further object 400.

With reference to FIG. 1, we also disclose a system 110 including the apparatus 100, the virtual reality apparatus 101 for providing the virtual reality view and at least one sensor 104, 105 configured to track one or more objects around the user while they consume the VR content and to provide for the determination of the relative locations of the identified physical real-world object 201 and further physical real-world object 400 such that the apparatus 100 may provide for display of the object image 203 described above to the user.

FIG. 8 shows a flow diagram illustrating the steps of, based on 800 virtual reality content for presentation to a user in a virtual reality space for viewing in virtual reality, wherein a virtual reality view presented to the user provides for viewing of the virtual reality content, and an identified physical real-world object; providing for display 801 of an object image that at least includes a representation of the identified physical real-world object that is overlaid on the virtual reality content presented in the virtual reality view, the object image displayed at a location in the virtual reality space that corresponds to a real-world location of the identified physical real-world object relative to the user, the object image further including at least a representation of a further physical real-world object that is identified as potentially hindering physical user-access to said identified physical real-world object.

FIG. 9 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, hands, or a stylus or other element suitable for performing free space user gestures. User inputs may also comprise voice or textual commands.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one non-transitory memory including computer program code, the at least one memory and the computer program code configured to, with the at least one processor, cause the apparatus to perform at least the following:
   based on virtual reality content for presentation to a user in a virtual reality space for viewing in virtual reality, provide a virtual reality view for display to the user, wherein the virtual reality view provides for viewing of the virtual reality content;
   identify a physical real-world object;
   identify a further physical real-world object; and
   provide for display of an object image that at least includes a representation of the identified physical real-world object, wherein the object image is overlaid on the virtual reality content presented in the virtual reality view at a location in the virtual reality space that corresponds to a real-world location of the identified physical real-world object relative to the user, the object image further including at least a representation of the further physical real-world object and a guide representation, the guide representation configured to suggest to the user a path to take in a real-world to interact with the identified physical real-world object while avoiding the further physical real-world object, wherein the path suggested with the guide representation is based, at least partially, on skeletal analysis of the user relative to the identified physical real-world object and the further physical real-world object to identify a reaching gesture for the user to interact with the identified physical real-world object.

2. The apparatus according to claim 1, wherein the further physical real-world object is identified as being one or more of:
- within a predetermined distance of the identified physical real-world object;
- within the predetermined distance of the identified physical real-world object and in front thereof relative to the user;
- within a predetermined distance of a line connecting the user and the identified physical real-world object;
- within a predetermined region identified with the skeletal analysis of the user to identify a range of motion the user is capable of given a location and an orientation of the user, the relative real-world location of the identified physical real-world object, and a real-world location of the further physical real-world object relative to the user;
- identified as such by the user; or
- identified as such by a person other than the user while the user is presented with the virtual reality content.

3. The apparatus according to claim 1, wherein the guide representation comprises a guide arrow, wherein the guide arrow is based on the relative real-world location of the identified physical real-world object and a real-world location of the further physical real-world object relative to the user, wherein the reaching gesture comprises the user extending a portion of the user beyond the real-world location of the further physical real-world object to interact with the identified physical real-world object, wherein the path suggested with the guide representation comprises a path along which the portion of the user is suggested to be extended.

4. The apparatus according to claim 3, wherein the path suggested with the guide arrow is based, at least partially, on one or more of:
- analysis of the relative real-world locations of the identified physical real-world object and the further physical real-world object to identify a shortest route to the identified physical real-world object while avoiding the further physical real-world object;
- a left or right handedness of the user; or
- the skeletal analysis of the user relative to the identified physical real-world object and the further physical real-world object to identify a route to the identified physical real-world object compatible with a range of motion the user is capable of given the relative real-world locations of the identified physical real-world object and the further physical real-world object.

5. The apparatus according to claim 1, wherein the object image is based on one or more of:
- camera imagery of at least one of the identified physical real-world object or the further physical real-world object from a camera mounted with a virtual reality display, wherein the virtual reality display is configured to provide the virtual reality view to the user; or
- camera imagery of at least one of the identified physical real-world object or the further physical real-world object from a camera with a view of a region surrounding the user.

6. The apparatus according to claim 1, wherein, based on detected real-world user motion, the at least one memory and the computer program code are further configured to, with the at least one processor, cause the apparatus to perform at least the following:
- provide for display of a representation of a hand of the user at a location in the virtual reality space that corresponds to a location of the hand of the user in the real-world.

7. The apparatus according to claim 1, wherein, based on detection that the user has moved a hand beyond the further physical real-world object, the at least one memory and the computer program code are further configured to, with the at least one processor, cause the apparatus to perform at least the following:
- provide for display of the object image with one or more of:
  - the representation of the further physical real-world object removed therefrom;
  - a transparency effect applied to the representation of the further physical real-world object; or
  - a visual effect to provide for viewing of at least part of the identified physical real-world object that is obscured by the further physical real-world object.

8. The apparatus according to claim 1, wherein, based on detection that the user has picked up the identified physical real-world object, the at least one memory and the computer program code are further configured to, with the at least one processor, cause the apparatus to perform at least the following:
- provide for display of a surface image comprising a representation of a real-world surface on which the identified physical real-world object was located prior to being picked up.

9. The apparatus according to claim 8, wherein the surface image includes a representation of the further physical real-world object at a location in the virtual reality space that corresponds to a real-world location of the further physical real-world object.

10. The apparatus according to claim 8, wherein, based on relative locations of the surface and the further physical real-world object, the surface image further comprises a further guide representation, the further guide representation configured to suggest to the user a path to take in the real-world in order to return the identified physical real-world object to the surface while avoiding the further physical real-world object.

11. The apparatus according to claim 1, wherein relative sizes of the identified physical real-world object and the further physical real-world object as presented in the object image are based on the relative real-world location of the identified physical real-world object and a relative real-world location of the further physical real-world object with respect to the user.

12. The apparatus according to claim 1, wherein the identified physical real-world object is one or more of:
- a user-identified physical real-world object, identified to the apparatus with a user input; or
- an automatically identified physical real-world object, identified to the apparatus with object recognition performed for a real-world region surrounding the user.

13. The apparatus according to claim 1, wherein the object image comprises at least one of:
- an icon representative of the identified physical real-world object;
- a photograph of the identified physical real-world object; or
- a live image of the identified physical real-world object;

and at least one of:
- an icon representative of the further physical real-world object;
- a photograph of the further physical real-world object; or
- a live image of the further physical real-world object.

14. A method, comprising
based on virtual reality content for presentation to a user in a virtual reality space for viewing in virtual reality, providing a virtual reality view for display to the user, wherein the virtual reality view provides for viewing of the virtual reality content;
identifying a physical real-world object;
identifying a further physical real-world object; and
providing for display of an object image that at least includes a representation of the identified physical real-world object, wherein the object image is overlaid on the virtual reality content presented in the virtual reality view at a location in the virtual reality space that corresponds to a real-world location of the identified physical real-world object relative to the user, the object image further including at least a representation of the further physical real-world object and a guide representation, the guide representation configured to suggest to the user a path to take in a real-world to interact with the identified physical real-world object while avoiding the further physical real-world object, wherein the path suggested with the guide representation is based, at least partially, on skeletal analysis of the user relative to the identified physical real-world object and the further physical real-world object to identify a reaching gesture for the user to interact with the identified physical real-world object.

15. The method according to claim 14, wherein the further physical real-world object is identified as being one or more of:
within a predetermined distance of the identified physical real-world object;
within the predetermined distance of the identified physical real-world object and in front thereof relative to the user;
within a predetermined distance of a line connecting the user and the identified physical real-world object;
within a predetermined region identified with the skeletal analysis of the user to identify a range of motion the user is capable of given a location and an orientation of the user, the relative real-world location of the identified physical real-world object, and a real-world location of the further physical real-world object relative to the user;
identified as such by the user; or
identified as such by a person other than the user while the user is presented with the virtual reality content.

16. The method according to claim 14, wherein the guide representation comprises a guide arrow, wherein the guide arrow is based on the relative real-world location of the identified physical real-world object and a real-world location of the further physical real-world object relative to the user.

17. The method according to claim 16, wherein the path suggested with the guide arrow is based, at least partially, on one or more of:
analysis of the relative real-world locations of the identified physical real-world object and the further physical real-world object to identify a shortest route to the identified physical real-world object while avoiding the further physical real-world object;
a left or right handedness of the user; or
the skeletal analysis of the user relative to the identified physical real-world object and the further physical real-world object to identify a route to the identified physical real-world object compatible with a range of motion the user is capable of given the relative real-world locations of the identified physical real-world object and the further physical real-world object.

18. The method according to claim 14, wherein the object image is based on one or more of:
camera imagery of at least one of the identified physical real-world object or the further physical real-world object from a camera mounted with a virtual reality display, wherein the virtual reality display is configured to provide the virtual reality view to the user; or
camera imagery of at least one of the identified physical real-world object or the further physical real-world object from a camera with a view of a region surrounding the user.

19. The method according to claim 14, further comprising, based on detected real-world user motion, providing for display of a representation of a hand of the user at a location in the virtual reality space that corresponds to a location of the hand of the user in the real-world.

20. A non-transitory computer readable medium comprising program instructions stored thereon for performing at least the following:
based on virtual reality content for presentation to a user in a virtual reality space for viewing in virtual reality, providing a virtual reality view for display to the user, wherein the virtual reality view provides for viewing of the virtual reality content;
identifying a physical real-world object;
identifying a further physical real-world object; and
providing for display of an object image that at least includes a representation of the identified physical real-world object, wherein the object image is overlaid on the virtual reality content presented in the virtual reality view at a location in the virtual reality space that corresponds to a real-world location of the identified physical real-world object relative to the user, the object image further including at least a representation of the further physical real-world object and a guide representation, the guide representation configured to suggest to the user a path to take in a real-world to interact with the identified physical real-world object while avoiding the further physical real-world object, wherein the path suggested with the guide representation is based, at least partially, on skeletal analysis of the user relative to the identified physical real-world object and the further physical real-world object to identify a reaching gesture for the user to interact with the identified physical real-world object.

* * * * *